（12） United States Patent
Granat

(10) Patent No.: US 8,564,271 B2
(45) Date of Patent: Oct. 22, 2013

(54) METHOD AND MEANS TO IMPLEMENT A CURRENT FOLLOWER OPERATION OF A BUCK MODE, SWITCHING POWER SUPPLY

(75) Inventor: Stanley M. Granat, Baldwinsville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 556 days.

(21) Appl. No.: 12/791,615

(22) Filed: Jun. 1, 2010

(65) Prior Publication Data

US 2011/0291623 A1 Dec. 1, 2011

(51) Int. Cl.
*G05F 1/00* (2006.01)

(52) U.S. Cl.
USPC ............................................. 323/285

(58) Field of Classification Search
USPC .................. 323/234, 282, 284, 285
See application file for complete search history.

(56) References Cited

U.S. PATENT DOCUMENTS

| | | | |
|---|---|---|---|
| 4,709,323 A | 11/1987 | Lien | |
| 5,530,335 A | 6/1996 | Decker et al. | |
| 5,648,731 A | 7/1997 | Decker et al. | |
| 6,108,114 A * | 8/2000 | Gilliland et al. | 398/195 |
| 6,118,676 A | 9/2000 | Divan et al. | |
| 6,587,356 B2 | 7/2003 | Zhu et al. | |
| 6,788,033 B2 | 9/2004 | Vinciarelli | |
| 7,023,187 B2 | 4/2006 | Shearon et al. | |
| 7,154,250 B2 | 12/2006 | Vinciarelli | |
| 7,382,114 B2 | 6/2008 | Groom | |
| 7,545,130 B2 * | 6/2009 | Latham | 323/283 |
| 7,560,909 B2 | 7/2009 | Coleman | |
| 7,596,006 B1 | 9/2009 | Granat | |
| 7,619,323 B2 | 11/2009 | Tan et al. | |
| 7,656,141 B1 * | 2/2010 | Granat | 323/284 |
| 7,714,547 B2 | 5/2010 | Fogg et al. | |
| 7,777,459 B2 | 8/2010 | Williams | |
| 7,782,027 B2 | 8/2010 | Williams | |
| 7,786,712 B2 | 8/2010 | Williams | |
| 7,821,238 B1 | 10/2010 | Li | |
| 7,889,524 B2 | 2/2011 | Lee et al. | |
| 7,960,957 B2 * | 6/2011 | Clavette et al. | 323/284 |
| 2007/0236201 A1 * | 10/2007 | Brown | 323/284 |
| 2007/0274015 A1 * | 11/2007 | Isham | 361/93.1 |
| 2008/0180075 A1 * | 7/2008 | Xie et al. | 323/282 |
| 2008/0284508 A1 * | 11/2008 | Walker et al. | 330/10 |
| 2009/0189583 A1 * | 7/2009 | Kawase et al. | 323/282 |
| 2010/0013304 A1 | 1/2010 | Heineman | |
| 2010/0013305 A1 | 1/2010 | Heineman | |
| 2010/0013306 A1 | 1/2010 | Heineman et al. | |
| 2010/0013307 A1 | 1/2010 | Heineman et al. | |
| 2010/0283322 A1 | 11/2010 | Wibben | |
| 2011/0006743 A1 | 1/2011 | Fabbro | |
| 2011/0043172 A1 | 2/2011 | Dearn | |
| 2011/0181112 A1 * | 7/2011 | Kwon | 307/31 |

* cited by examiner

*Primary Examiner* — Adolf Berhane
*Assistant Examiner* — Jeffrey Gblende
(74) *Attorney, Agent, or Firm* — Howard IP Law Group, PC

(57) ABSTRACT

A buck mode power supply monitors the pulse load current for use as a scaled reference for comparison to a measured output current from each stage of the supply. A correction signal is generated for each stage by comparing the reference to the measured output currents. This result is compared to a second reference created from the system clock. A resulting second correction signal is used to alter the threshold reference voltage in a manner that provides proportional pulse width control to the supply output.

13 Claims, 11 Drawing Sheets

US 8,564,271 B2

METHOD AND MEANS TO IMPLEMENT A CURRENT FOLLOWER OPERATION OF A BUCK MODE, SWITCHING POWER SUPPLY

FIELD OF THE INVENTION

The present invention relates generally to power supplies, and more specifically, to implementing a current follower operation into a buck mode switching power supply.

BACKGROUND

Switched mode, pulse width modulated, fast transient power supplies are a common form of voltage regulator useful in a wide variety of applications, including radar systems. These supplies are structured to generate the pulse power required by a radar transmitter subsection of an antenna array. Because these power levels are large compared to the average power of the load, implementation as a single power converter becomes problematic. Multiple paralleled converters are therefore required. This mandates current sharing between the paralleled stages to prevent over stressing any one supply. However, component variation in the individual converter stages leads to current supply imbalances.

Moreover, typical averaged current feedback control mechanisms provide a less than desirable transient response. That is, due at least in part to current sharing among the multiple paralleled stages, a faster transient response is desired than is usually provided by conventional averaged current feedback controls. Traditional approaches monitor the output voltage of the converter and respond to deviations in its level. However, the control loop bandwidth is normally less than the switching frequency and lags behind the pulse current level. Further, current sharing between multiple supplies utilize master/slave implementation of an averaged current reference level and contain a separate control loop to trim the output voltage reference of each shared supply with a goal of balancing the output currents. The averaging slows response time and the control loop adds complexity to the design.

Accordingly, a method and system for balancing the output of the paralleled converter stages while providing for fast transient response is desired.

SUMMARY

In one embodiment of the present invention, a switched mode power supply is provided. The supply comprises at least two converter stages arranged in parallel. A pulse width modulator is provided which monitors the load current. The load current is used as a scaled reference for comparison with a monitored output inductor current from each stage. A correction signal for each converter stage is generated as a result of this comparison. These correction signals are compared to an ideal reference signal generated by the system clock. The result of this comparison is combined with the threshold reference level used in the pulse width modulator to control the pulse width of the output current until the load current and average output inductor current are equal.

DETAILED DESCRIPTION OF PREFERRED EMBODIMENTS

Reference will now be made in detail to the present exemplary embodiments of the invention, examples of which are illustrated in the accompanying drawings.

Figure 1:
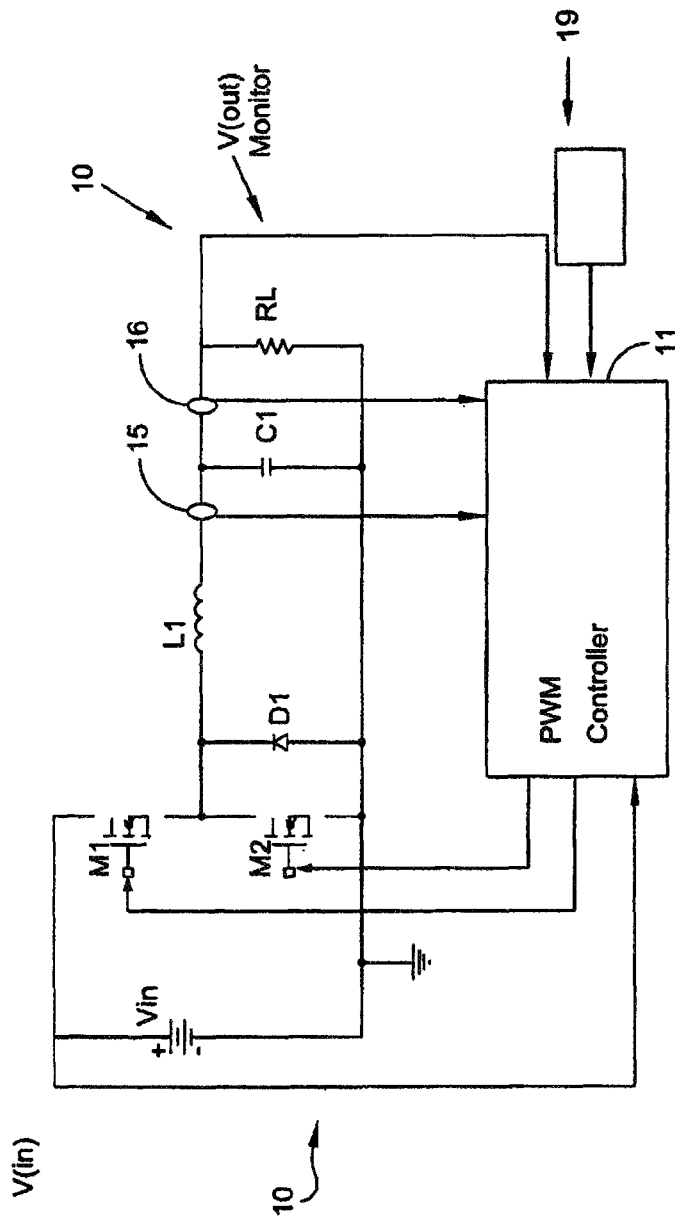
FIG. 1 is a simplified circuit diagram of a buck mode power supply utilizing the current follower arrangement of the present invention.
Figure 2:
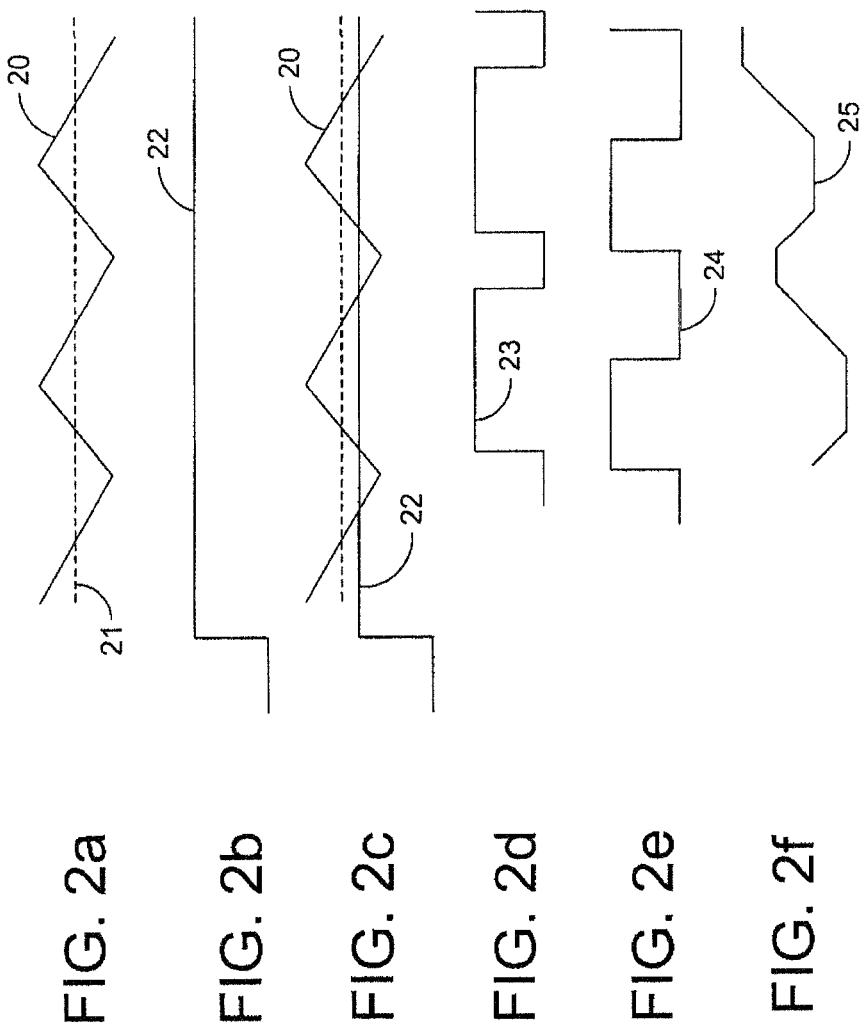
FIGS. 2a-f are plots illustrating the operation of the current follower arrangement of the present invention.

Referring generally to FIGS. 1 and 2a-f, the basic operation of a single stage buck mode converter with the current follower arrangement of the present invention is described. FIG. 1 shows a buck mode supply 10 including transistors M1 and M2 operatively connected to a pulse width modulator (PWM) 11 configured to selectively couple an inductor L1 to an input voltage source V. The PWM 11 may be configured to provide, for example, average current control over the output of the supply 10. The PWM 11 monitors the inductor output current at a node 15. The resulting inductor output current from this type of average current control takes the form a saw-tooth waveform alternating between a minimum and maximum level set by a predetermined threshold voltage as shown in FIG. 2a. By definition, the average output current 21 lies between these maximum and minimum values.

PWMs traditionally monitor the inductor current 20 as well as the output voltage $V_{out}$ of the capacitor C1 in their feedback loops. However, one aspect of the present invention is to shift the control methodology to monitor the load current level directly and correct the threshold voltage level of the PWM 11. In this way, faster transient responses can be achieved, as well as the ability to balance the output current of parallel converter stages.

In addition to monitoring the inductor output current 20, the PWM 11 monitors the current drawn by the load 22 (FIG. 2b) at node 16. Both the inductor output current 20 and the load current 22 are applied to a comparator (FIG. 2c) for generating a first correction signal 23 (FIG. 2d).

During ideal converter stage operation, the average output current 21 of the inductor will be equal to the pulsed load current 22. A comparator presented with these two ideal signals, 20 22, will produce a square wave at the switching cycle frequency. The inductor output current 20 will spend half of the cycle time above the average output 22 and the other half of the cycle time below the average output (FIGS. 2c and 2e).

In order to correct the average inductor output current 21 to match the pulsed load current, the PWM 11 further comprises a function generator, preferably tied to a system clock 19 (FIG. 1), for producing a square wave signal 24 having a frequency equal to the switching frequency of the inductor output current 20. By differential integration of the correction signal 23 and the ideal square wave signal 24, a second correction signal 25 is generated. This second correction signal 25 is combined with the PWM 11 threshold reference voltage level to dither the control pulses provided to transistors M1 and M2 (FIG. 1), thus altering the pulse width of the inductor output current 20 until its average current 21 matches that of the load current 22. In this way, the resulting correction signal 25 should stabilize or flatten as the average inductor current 21 approaches the value of the load current 22.

While the above describes the principles behind the operation of the current follower arrangement of an embodiment of the present invention, its implementation into a power supply having multiple converters will be described in more detail below.

Figure 3:
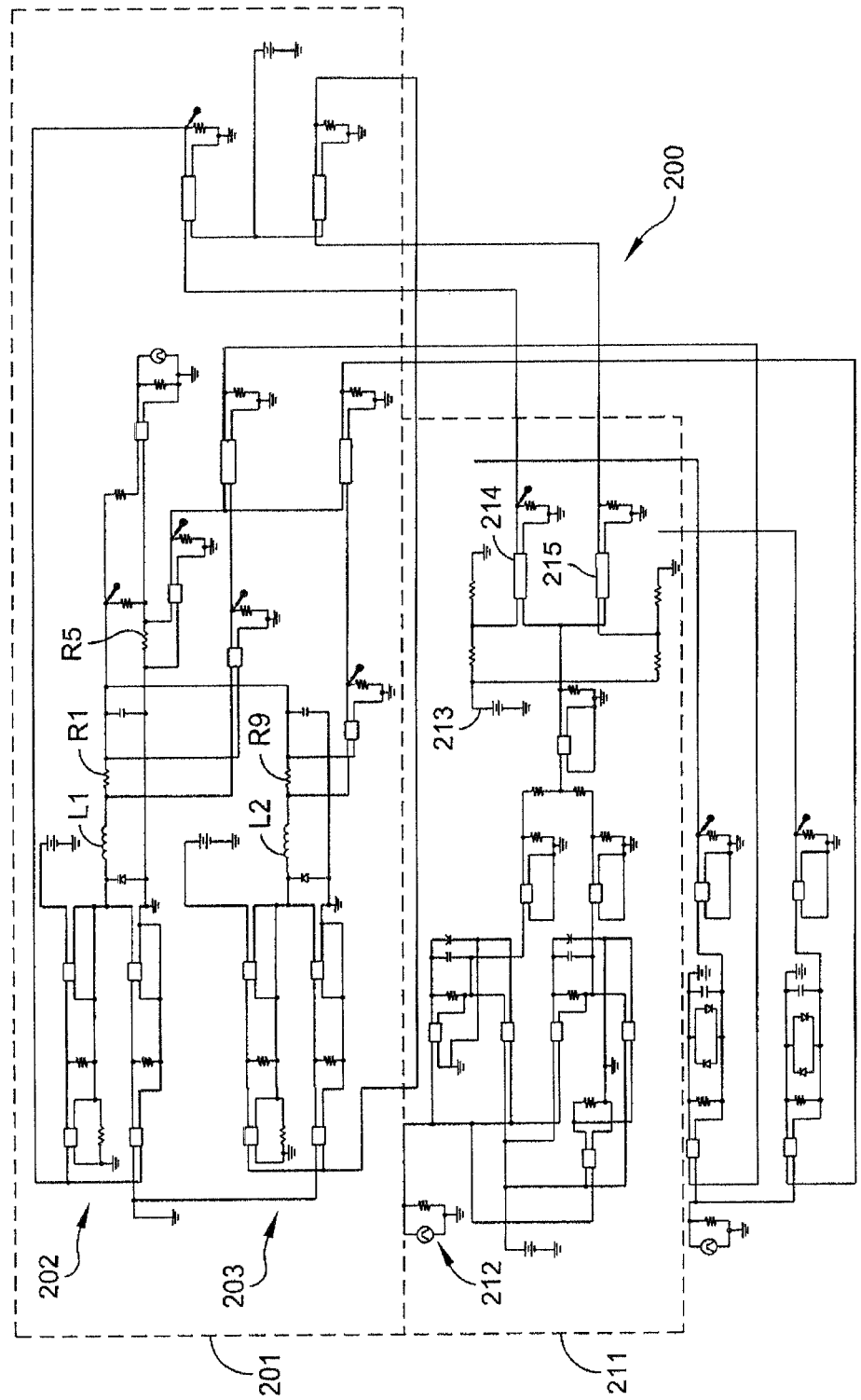
FIG. 3 is a circuit diagram of a simulator having two buck converter stages with the current follower arrangement of the present invention disconnected.

FIG. 3 shows a circuit diagram of a simulated buck mode power supply 200 with the current follower arrangement of the present invention disconnected therefrom for purposes of demonstrating its operational benefits. The power converter section 201 comprises two buck converting stages 202,203 arranged in parallel. For purposes of this simulation, the inductors L1,L2 of the first and second buck converter stages 202,203 are set to 20% over and 20% under nominal, respectively, representative of typical component variations between multistage power supplies. The PWM portion 211 of the supply 200 comprises a signal generator 212 used to generate the saw-tooth wave provided to the input terminals of first and second comparators 214, 215. A threshold reference voltage source 213 is provided to the input terminals of the comparators 214,215, and provides the threshold voltage level for the average current control. The outputs of comparators 214,215 are fed into the first and second buck converter stages 202,203 respectively, and control the charging of the inductors L1,L2, and thus the pulse width of the inductor output current 20 (FIG. 2a).

Figure 4:
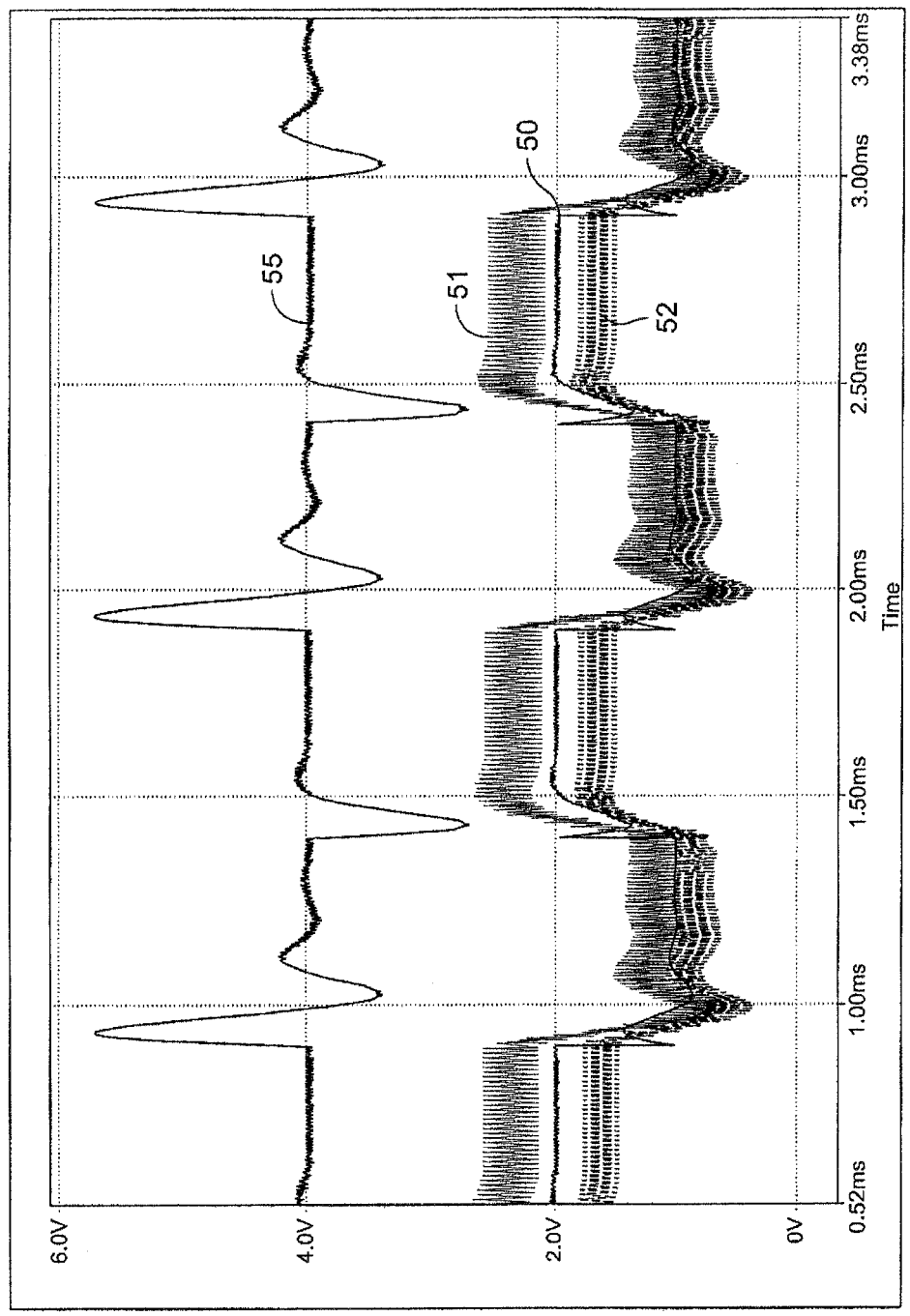
FIGS. 4 and 5 are plots of the load and output inductor currents of the two buck converter stages of the simulator shown in FIG. 3. These are shown operated with the same PWM source and have their inductor values set to opposite component tolerance levels.
Figure 5:
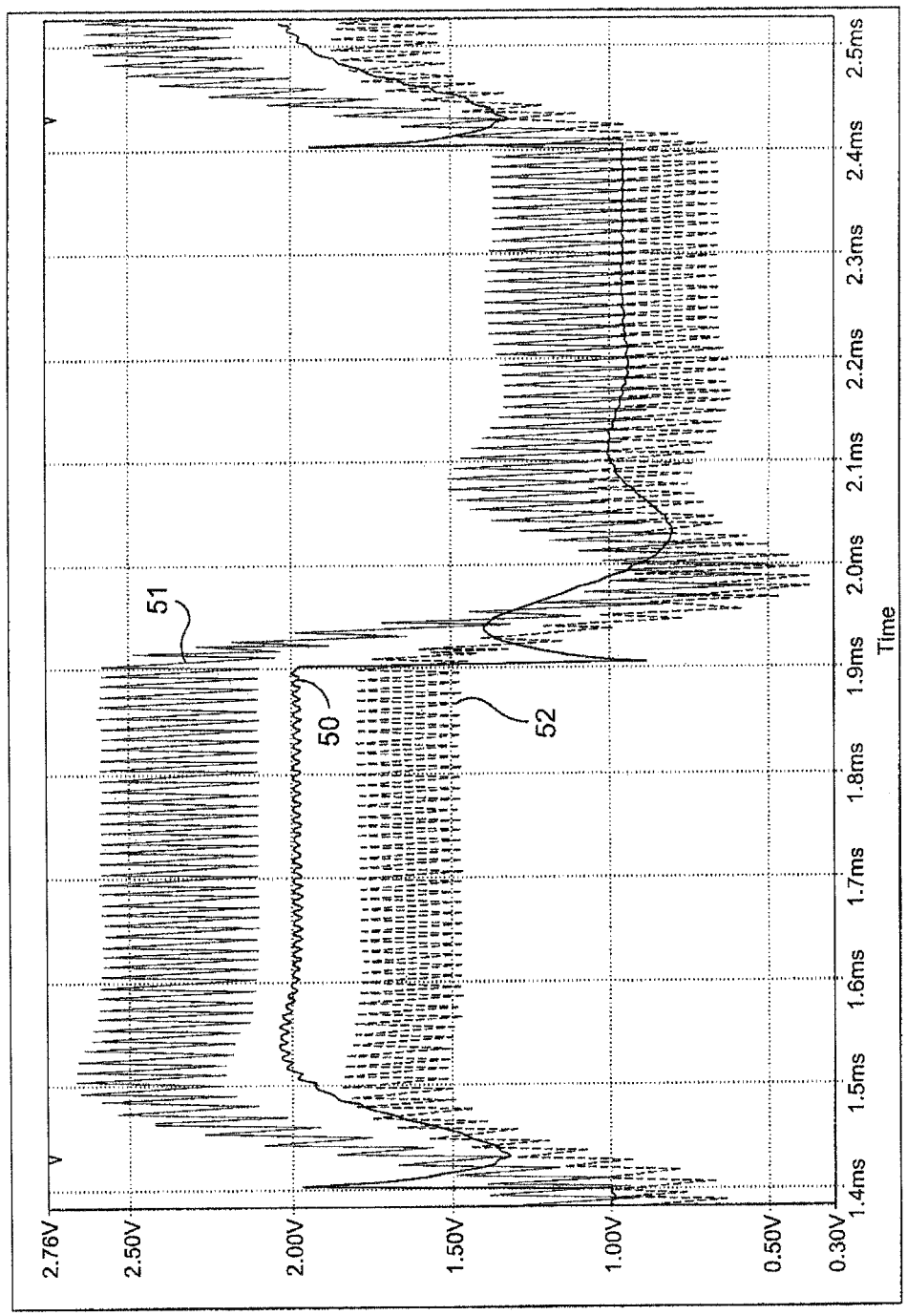

As discussed above, the variations in the components making up the first and second buck converter stages result in output current variations between stages, as well as with the load current. Referring generally to FIGS. 4 and 5, there are shown curves depicting the load and output currents of the two buck converter stages of the simulator depicted in FIG. 3. The output voltage 55 under open loop control is centered around 4V. Trace 50 is the load current reference which is stepped from 2 A to 4 A to demonstrate current follower response. Trace 51 is the inductor output current from the first buck converter stage 202. In the first buck converter stage 202, the inductor is set to 80% of nominal, resulting in an average output current 51 approximately 15% higher than the load current 50. Similarly, trace 52 is the inductor output current from the second buck converter stage 203, set at 120% of nominal, with a resulting average output current 52 of approximately 15% less than the load current 50. As shown, the output currents of the first and second buck converters are imbalanced.

Figure 6:
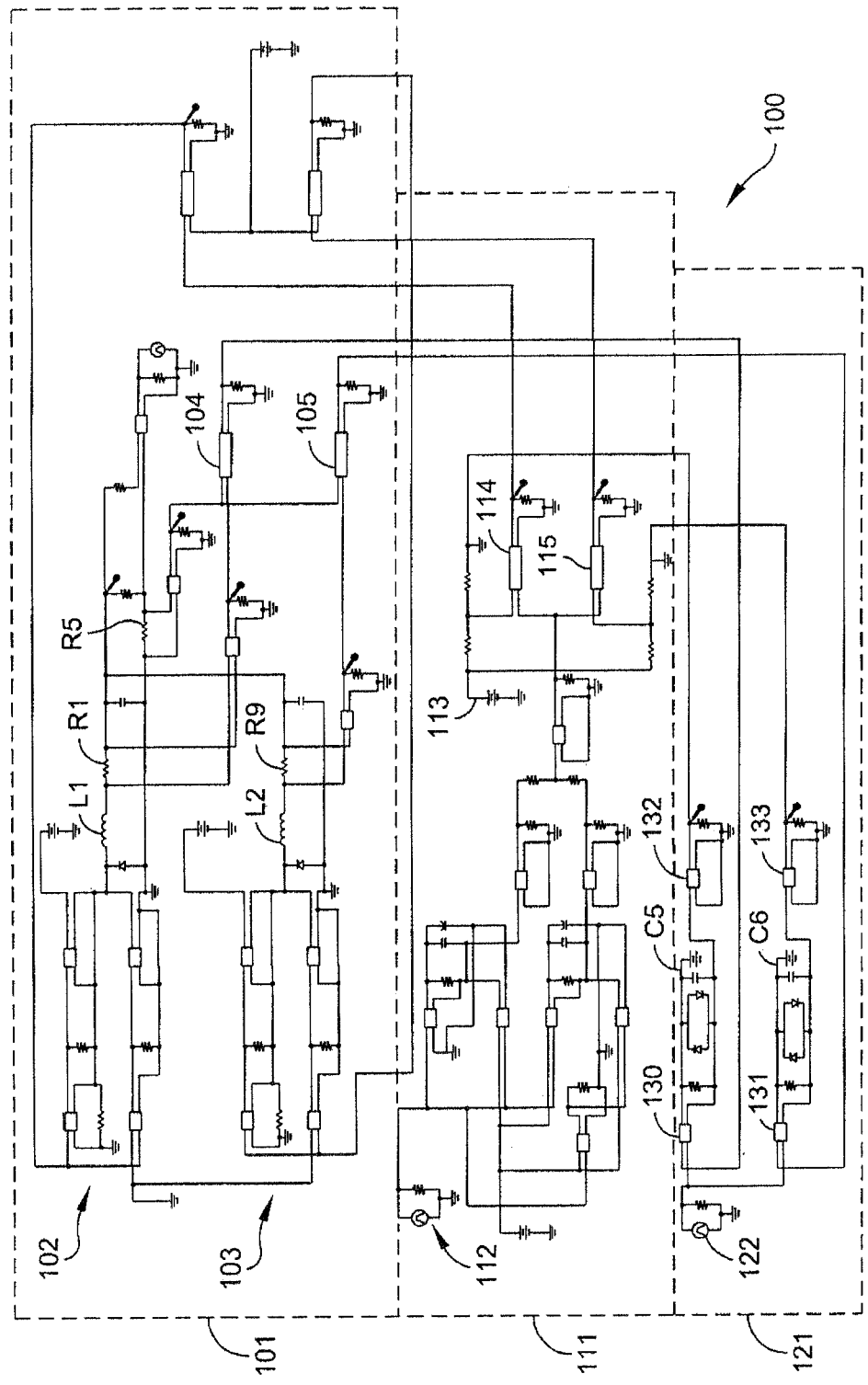
FIG. 6 is a circuit diagram of a simulator having two buck converter stages with the current follower arrangement of the present invention connected.

FIG. 6 shows a simulated buck mode power supply 100 implementing the current follower arrangement according to an embodiment of the present invention. The power converter section 101 comprises two buck converter stages 102,103 arranged in parallel (see also FIG. 6a). As with the simulation described above with respect to FIG. 3, the inductors L1,L2 of the first and second buck converter stages 102,103 are set to 20% over and 20% under nominal respectively.

Figure 6A:
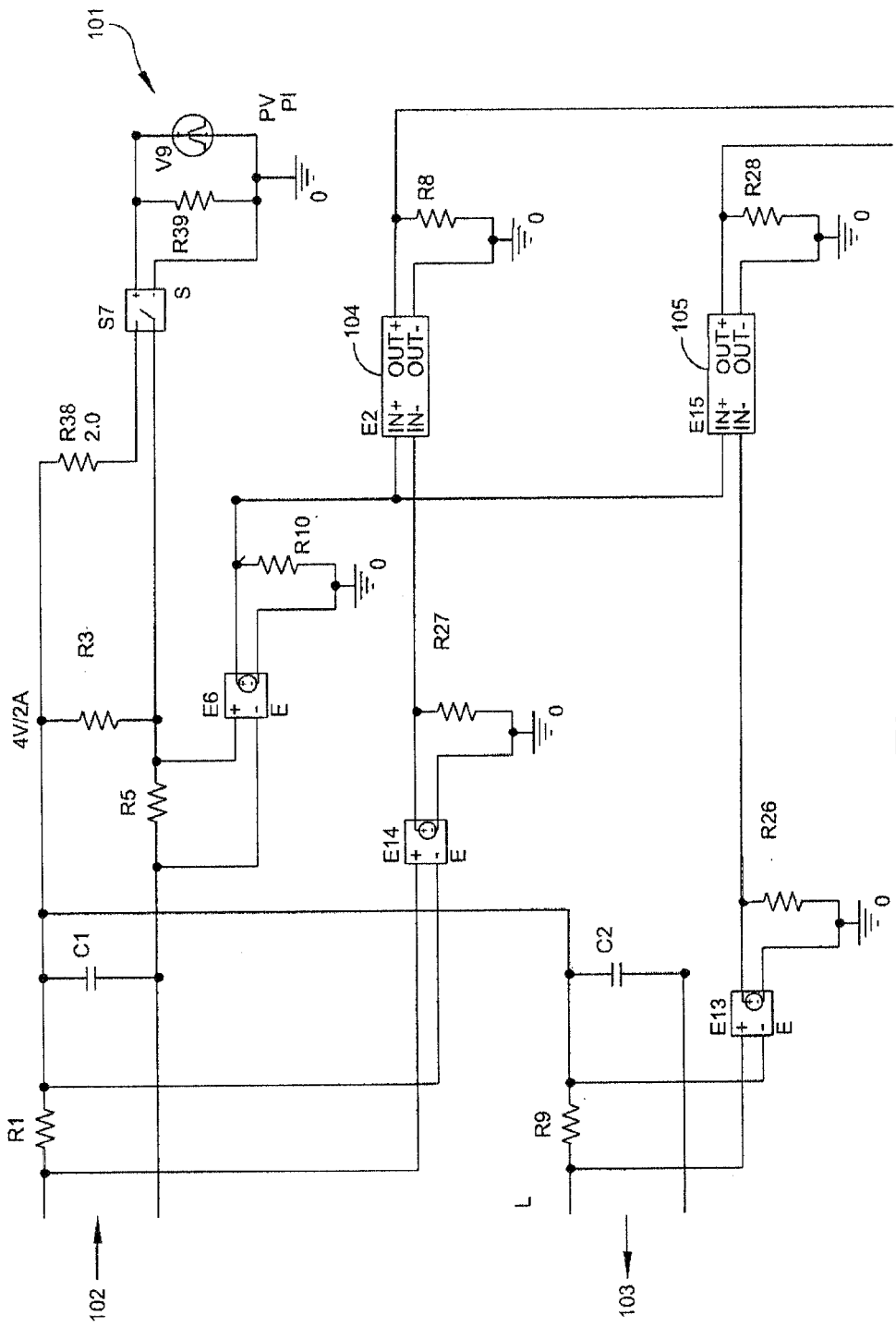
FIGS. 6a-c are detailed views of portions of the circuit shown in FIG. 6.
Figure 6B:
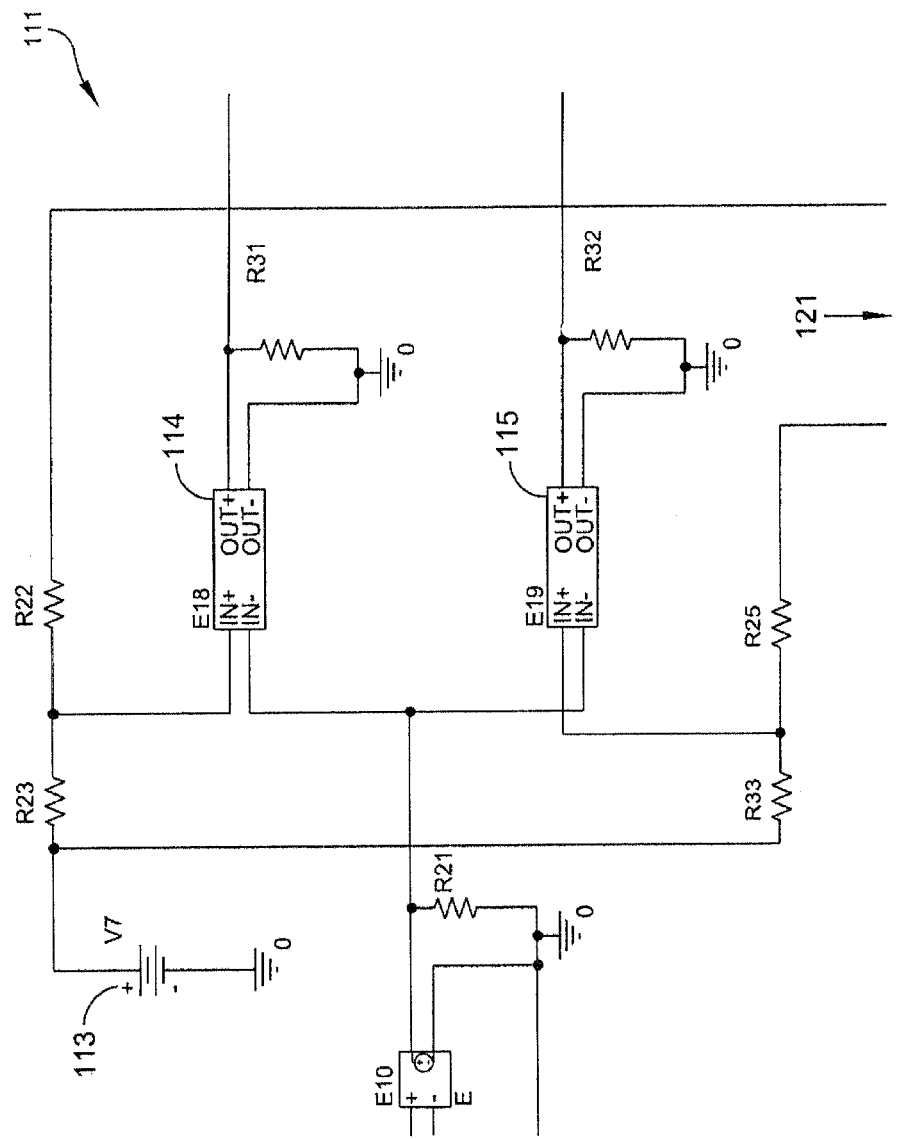

The PWM 111 of the supply 100 comprises a signal generator 112 for providing a saw-tooth pattern to the input terminals of the comparators 114,115 (see also FIG. 6b). A threshold reference voltage source 113 is provided to the remaining input terminals of the comparators 114,115, and is used set the threshold voltage level for the average current control. The output of the comparators 114,115 is supplied to the first and second buck converter stages 102,103 respectively, to control the on/off charging of the inductors L1,L2 and thus the pulse width of the inductor output currents.

Figure 6C:
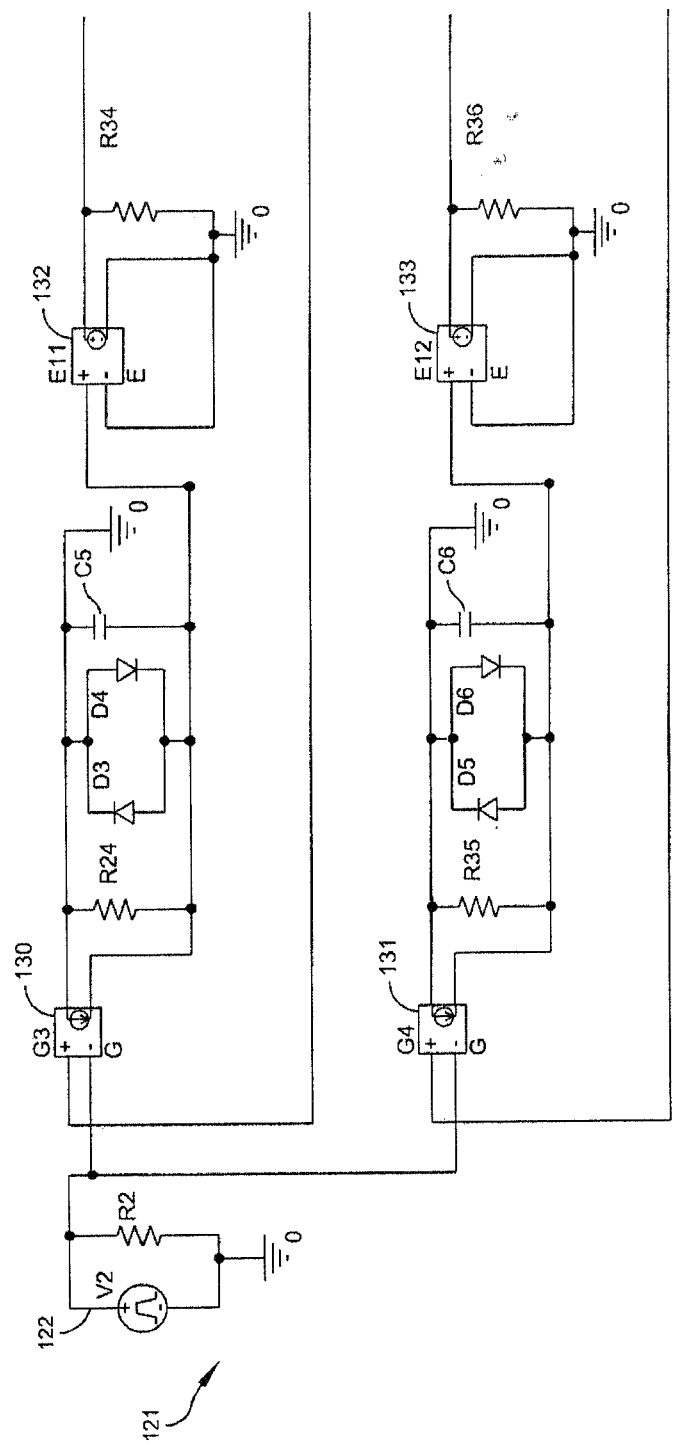

Still referring to FIGS. 6 and 6a, resistors R1 and R9 monitor both the DC and AC from the inductors L1,L2 respectively, while resistor R5 monitors the load current (FIG. 2b, 22) and provides a scaled reference to the comparators 104,105. The inductor output currents (FIG. 2a, 20) measured at the inductors L1,L2 of each buck converter stage 102,103 are input into respective comparators 104,105. The comparators 104,105 generate a resultant first correction signal (FIG. 2d, 23) which is provided to a differential integrator circuit 121. The differential integrator circuit 121 comprises a pulse generator 122, preferable tied to the system clock and configured to output a square wave (FIG. 2c, 24) at the switching frequency of the inductor output current (see also FIG. 6c). As described in detail above with respect to FIG. 2e, this square wave represents the ideal result of the comparison between the inductor output current 20 and the load current 22.

The circuit 121 comprises capacitors C5,C6 fed by bipolar current sources 130,131 configured to perform the differential integration of the first correction signal 23 and the ideal square wave 24. While the implementation shown in FIGS. 6 and 6c comprises transconductance amplifiers for providing current to the capacitors C5,C6, the arrangement could be implemented in any suitable manner, including the use of gated transistor current sources.

Amplifiers 132,133 may be utilized as impedance buffers for the outgoing dithered correction signal (FIG. 2f, 25). The signal 25 is added to the threshold reference voltage supply 113, thus altering the previously fixed reference voltage supplied to the input of the comparators 114,115. These dither signals may be interfaced with the comparators 114,115 by resistor summers. For example, resistors R23 and R22 merge the dithered correction signal with the reference level supplied by the reference voltage source 113, the result of which is supplied to the input of comparator 114. Likewise, resistors R33 and R25 merge the correction signal provided by the second channel of the integrator circuit 121 with the reference voltage source 113 which is subsequently supplied to the input of comparator 115. By altering the reference voltage to the comparators 114,115, the drive pulse supplied back to each buck converter 102, 103 is dithered, and the resulting inductor outputs corrected to each produce an average current equal to that of the load current.

Figure 7:
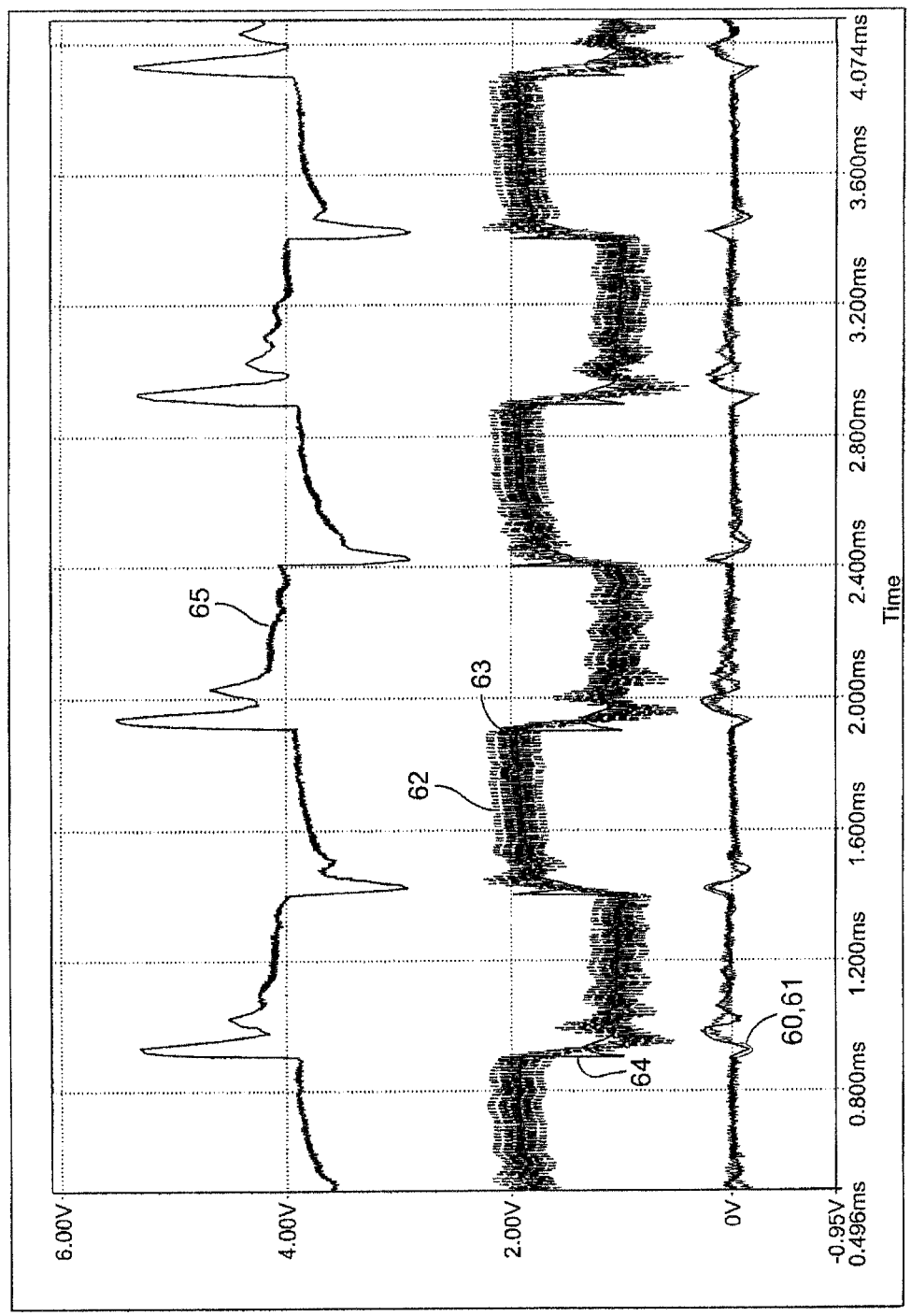
FIGS. 7 and 8 are plots of the load and output inductor currents of the two buck converter stages of the simulator shown in FIG. 6 utilizing the control strategy of the present invention.
Figure 8:
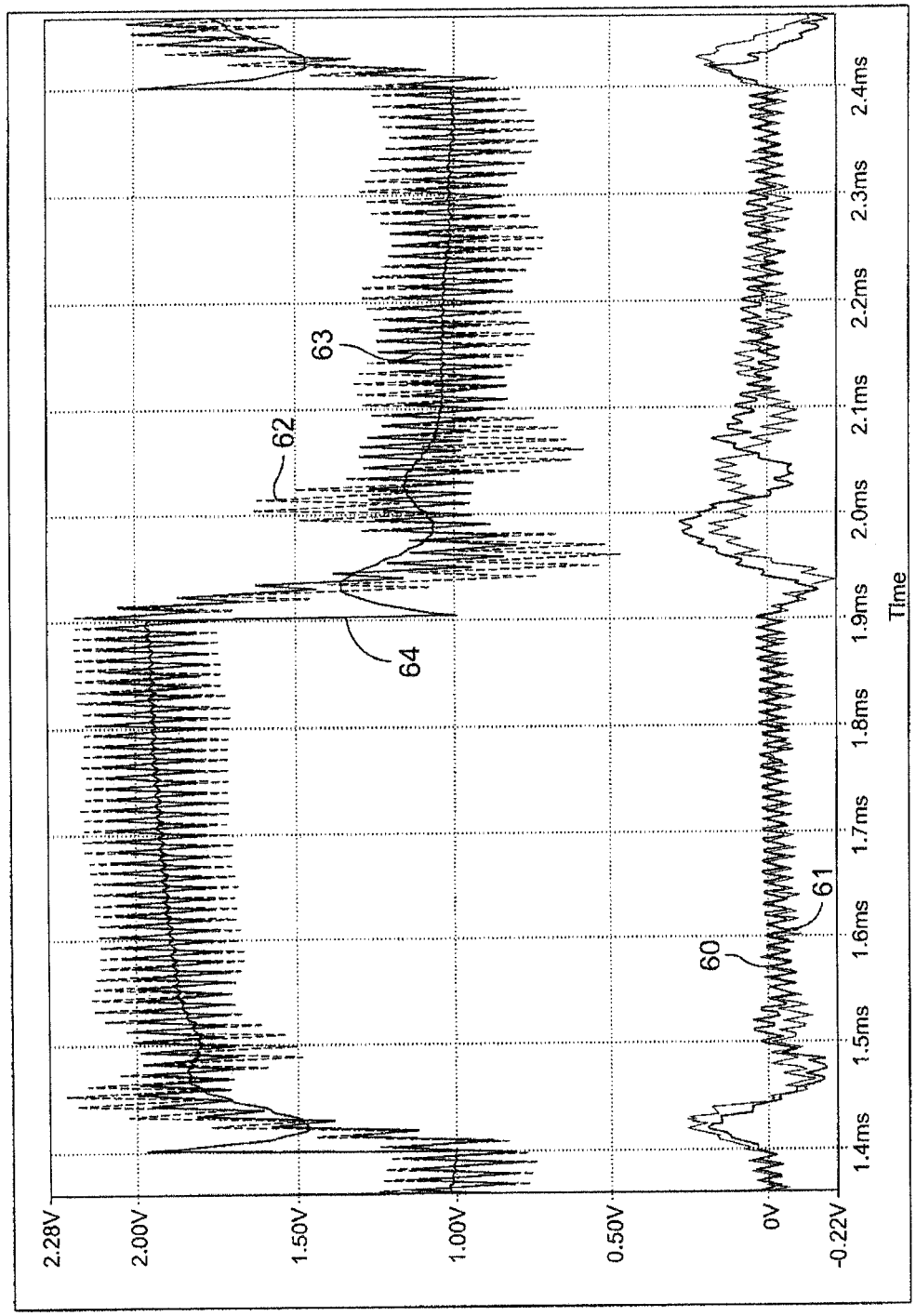

FIGS. 7 and 8 show the output of the simulation run in the circuit of FIG. 6, with the current follower arrangement of the present invention tied to the PWM 111. The output voltage 65 under open loop control is centered around 4V. First and second traces 60,61 represent the corrective voltages combined with the fixed threshold reference voltage 113 before being applied to the comparators 114,115 respectively. As described above with respect to FIG. 2, as the average inductor output currents 21 approach the load current 22, these voltages move toward zero, as the comparison between the inductor output voltage waveform 20 and the load current 22 results in the ideal square wave reference. Accordingly, inductor output currents 62,63 of the first and second buck converter stages respectively track one another, as well as the load current 64, despite the inductors L1,L2 of the first and second buck mode supplies 102,103 set at 20% over and 20% under nominal respectively. Of note, the inductor output current traces 62,63 are overlapping and distributed generally equally over the load current 64, as distinct from the offsets shown in the simulation results of FIGS. 4 and 5. Thus, the current follower arrangement of the present invention acts to balance the output of each of the parallel buck converter stages 102,103 with respect to the load current.

While the above-described embodiments relate to a switching power supply having two converter stages, it is envisioned that the control method described therein may be utilized in power supplies having any number or stages without departing from the scope of the present invention.

While the above-described embodiments and accompanying diagrams describe particular circuit devices, such as comparators, inductors, and integrating circuits, it is envisioned that these devices may be replaced with alternatives suitable to achieve the described desired function without departing from the scope of the present invention.

While the foregoing describes exemplary embodiments and implementations, it will be apparent to those skilled in the art that various modifications and variations can be made to the present invention without departing from the spirit and scope of the invention.

What is claimed is:

1. A method for controlling a switching power supply comprising the steps of:
    monitoring a load current for use as a first reference;
    monitoring an output current of the supply;
    generating a first correction signal by comparing the first reference to the output current;
    generating a second correction signal by comparing the first correction signal to a second reference; and
    altering a threshold voltage of a pulse width modulator of a supply output with the second correction signal until the first reference and an average output current align;
    wherein the steps of generating a first correction signal and generating a second correction signal are performed in parallel with a primary control loop of the pulse width modulator.

2. The method of claim 1, wherein the step of altering the threshold voltage of a pulse width modulator comprises combining the second correction signal with a fixed threshold voltage supplied to the pulse width modulator.

3. The method of claim 1, wherein the step of monitoring the output current of the supply comprises monitoring the output current of at least two converter stages in a multistage power supply.

4. The method of claim 1, wherein the second reference is a square wave having a frequency equal to a switching frequency of the power supply.

5. The method of claim 1, wherein the step of generating a second correction signal by comparing the first correction signal to a second reference includes differential integration of the first correction signal and the second reference.

6. A switching power supply comprising:
    at least one power converting stage operatively connected to a load;
    a controller configured to monitor an output current of the power converting stage and a load current;
    a first signal generator configured to produce a first correction signal by comparing the load current to the output current;
    a second signal generator for providing a reference signal;
    a third signal generator configured to produce a second correction signal by comparing the first correction signal to the reference signal; and
    a pulse width modulator having a primary control loop;
    wherein the first signal generator, the second signal generator, and the third signal generator are configured to operate in parallel with the primary control loop of the pulse width modulator; and
    wherein the second correction signal provides pulse width control of a power supply output.

7. The switching power supply of claim 6, wherein the first signal generator comprises a comparator.

8. The switching power supply of claim 6, wherein the reference signal is created from a system clock.

9. The switching power supply of claim 6, wherein the at least one power converting stage comprises at least two power converting stages.

10. The switching power supply of claim 6, wherein the reference signal comprises a square wave having a frequency equal to a switching frequency of the supply.

11. The switching power supply of claim 6, wherein the second correction signal alters a threshold reference voltage used to provide average current control over the power supply output.

12. The switching power supply of claim 6, wherein the second correction signal provides control of the pulse width of the supply output and is operative to alter an average supply output current until it matches an average load current.

13. The switching power supply of claim 6, wherein the third signal generator comprises a differential integrator.

* * * * *